(12) United States Patent
Dexter et al.

(10) Patent No.: US 8,376,435 B2
(45) Date of Patent: Feb. 19, 2013

(54) CONFIGURABLE SEATING AND CONSOLE SYSTEM

(75) Inventors: Brian R. Dexter, Grand Haven, MI (US); Jeffrey T. Stout, Grand Rapids, MI (US); Gregory N. Brncick, Holland, MI (US); Alan G. Greene, Grandville, MI (US); Steven D. Lepley, Grand Haven, MI (US); Joseph M. Thompson, Lake Stevens, WA (US); Robert C. Fitzpatrick, Holland, MI (US); Michael J. Burns, Holland, MI (US); David J. Spykerman, Chandler, AZ (US); Michael R. Catlin, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 666 days.

(21) Appl. No.: 11/989,855

(22) PCT Filed: Aug. 3, 2006
(Under 37 CFR 1.47)

(86) PCT No.: PCT/US2006/030402
§ 371 (c)(1),
(2), (4) Date: Nov. 23, 2009

(87) PCT Pub. No.: WO2007/019290
PCT Pub. Date: Feb. 15, 2007

(65) Prior Publication Data
US 2010/0156128 A1 Jun. 24, 2010

Related U.S. Application Data

(60) Provisional application No. 60/705,717, filed on Aug. 4, 2005.

(51) Int. Cl.
*B60N 2/30* (2006.01)
(52) U.S. Cl. .................. 296/24.34; 296/64; 296/65.16
(58) Field of Classification Search .............. 296/24.34, 296/64, 63, 66, 65.16, 69, 1.09; 297/115, 297/188.15, 411.32, 117, 411.33, 411.34
See application file for complete search history.

(56) References Cited

U.S. PATENT DOCUMENTS

| 3,666,319 | A | | 5/1972 | Moloney, Jr. |
| 5,540,479 | A | | 7/1996 | Thomas et al. |
| 5,788,324 | A | * | 8/1998 | Shea et al. .................. 297/113 |
| 6,217,112 | B1 | * | 4/2001 | Linsenmeier et al. ........ 297/113 |

(Continued)

FOREIGN PATENT DOCUMENTS

| DE | 37 05 770 A1 | 9/1988 |
| DE | 38 14 758 A1 | 11/1989 |

(Continued)

OTHER PUBLICATIONS

Communication Under Rule 71(3) EPC dated Aug. 2, 2011 as received in corresponding EP Application No. EP 06789380.0.

(Continued)

*Primary Examiner* — Jason S Morrow
(74) *Attorney, Agent, or Firm* — Foley & Lardner LLP

(57) ABSTRACT

A seating and console system for use in a seating row and configurable between a seating configuration and a console configuration. The system comprises a seat including a seat base and a seat back, and a console mounted to an opposite side of the seat back. The seat back rotates between a first position to provide the seating configuration and a second position to provide the console configuration that divides the seating row.

21 Claims, 10 Drawing Sheets

U.S. PATENT DOCUMENTS

| | | | |
|---|---|---|---|
| 6,386,629 B1 * | 5/2002 | Severinski et al. | 297/188.1 |
| 7,255,384 B2 * | 8/2007 | Saberan et al. | 296/65.09 |
| 7,393,038 B2 * | 7/2008 | Yajima et al. | 296/65.03 |
| 7,775,577 B2 * | 8/2010 | Behrens | 296/64 |
| 2004/0160080 A1 * | 8/2004 | Shibata et al. | 296/64 |
| 2005/0052044 A1 * | 3/2005 | Toyota et al. | 296/24.34 |
| 2007/0013212 A1 * | 1/2007 | Meister | 297/115 |
| 2007/0205623 A1 * | 9/2007 | Hung et al. | 296/24.34 |
| 2009/0160227 A1 * | 6/2009 | Crombez et al. | 297/113 |
| 2010/0102585 A1 * | 4/2010 | Kato et al. | 296/24.34 |

FOREIGN PATENT DOCUMENTS

| | | |
|---|---|---|
| DE | 38 25 781 A1 | 2/1990 |
| DE | 103 41 664 A1 | 3/2005 |
| EP | 0 943 482 A2 | 9/1999 |
| FR | 2707569 A1 | 1/1990 |
| GB | 0 167 6 A | 0/1913 |
| JP | 62-006035 | 1/1987 |
| JP | 01-165737 | 11/1989 |
| JP | 11-321464 | 11/1999 |
| JP | 2003-118456 A | 4/2003 |
| WO | WO-99/03377 A | 1/1999 |

OTHER PUBLICATIONS

International Search Report dated Jan. 17, 2007 as received in corresponding PCT Application No. PCT/US2006/030402.

Office Action dated Aug. 16, 2011 as received in corresponding JP Application No. 2008-525217.

* cited by examiner

CONFIGURABLE SEATING AND CONSOLE SYSTEM

CROSS-REFERENCE TO RELATED PATENT APPLICATIONS

This application is the National Phase application of International Application Number PCT/US2006/030402 filed Aug. 3, 2006, which claims priority from U.S. Provisional Application No. 60/705,717, filed Aug. 4, 2005, titled "CONFIGURABLE SEATING AND CONSOLE SYSTEM" both of which is are incorporated herein by reference in its their entirety.

BACKGROUND

The present invention relates to a configurable seating and console system. The present invention more specifically relates to seating row system that transforms into a floor console with coordinated mechanical or powered movement.

It is known to provide a second row of seating with a center console located between two outboard seats. Such known second row center consoles are typically only available in some luxury vehicle models. The second row center console may connect with a center console disposed between the front seats. Such arrangements are intended to provide utility and functionality to the second row occupants with a sporty or luxurious appearance. However, such permanent second row consoles limit seating capacity and other flexibility of the vehicle.

It is also known to provide for an armrest in second (or third, etc.) row seating that pivots to provide a functional or console surface. Such known armrests may comprise an armrest that, when pivoted to the deployed position, has console functionality (e.g., storage areas, cup holders). However, such known armrests do not realize certain advantageous features (and/or combinations of features) or desired appearance that permanent second-row, center consoles provide. For example, such known armrests have spaces and gaps that show the pivoted contours of the armrest and seat. These gaps and contours do not provide the desired appearance permanent second-row, center console.

Accordingly, it would be advantageous to provide a configurable seating and console system. It would also be desirable to provide a seating and console system that can be configured (reconfigured, transformed, etc.) between bench seating and split seating with a console between the outboard seats. It would further be desirable to provide such a system with "close outs" for spaces or gaps that would be exposed when the system is in the console configuration. It would further be desirable to provide a console that has an upper surface generally vertically aligned with the adjacent (outboard) seats. It would further be desirable to provide a console configuration that, when deployed, appears to be the permanent configuration of the vehicle interior by covering, hiding, obscuring the elements and contours of the seat. It would further be desirable to provide an articulation mechanism that lowers the seat so that the vertical height console is generally aligned with the outboard seats. To provide an inexpensive, reliable, and widely adaptable configurable seating and console system that avoids the above-referenced and other problems would represent a significant advance in the art.

SUMMARY

The present invention relates to a seating and console system for use in a seating row and configurable between a seating configuration and a console configuration. The system comprises a seat including a seat base and a seat back; and a console mounted to an opposite side of the seat back. The seat back rotates between a first position to provide the seating configuration and a second position to provide the console configuration that divides the seating row.

The present invention also relates to a vehicle interior. The vehicle interior comprises a first seating row comprising a first seat, a second seat, and a first row console between the first seat and the second seat; and a second seating row comprising a first seat, a second seat, and a seating console system between the first seat and the second seat. The seating console system comprises a seat comprising a seat base and a seat back, and a second row console coupled to the seat and configured to engage the first row console in the first seating row. The seating console system is configurable between a seating configuration to deploy the seat and stow the console, and a console configuration to deploy the console and stow the seat.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF THE PREFERRED AND EXEMPLARY EMBODIMENTS

Figure 1:
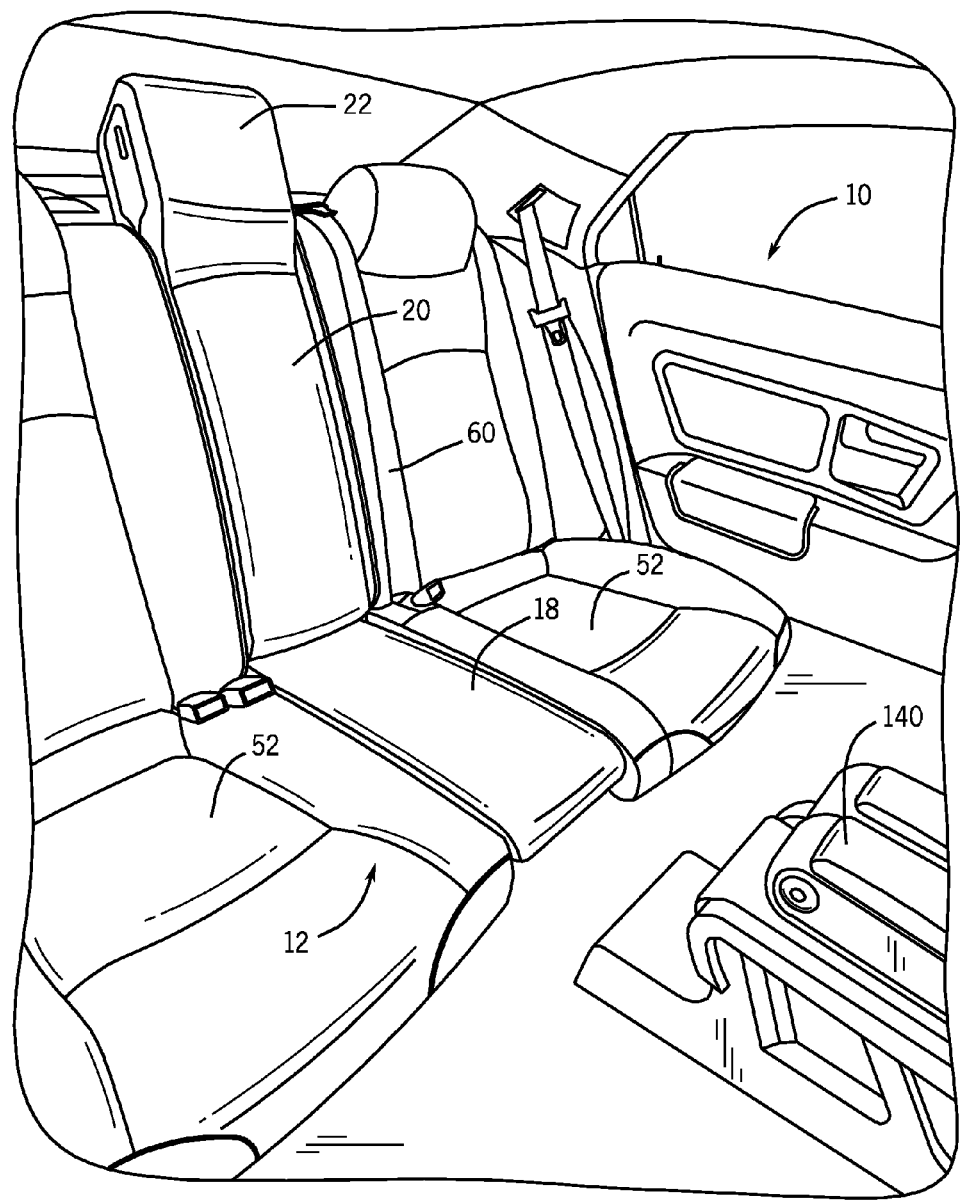
FIG. 1 is a perspective view of a vehicle interior with a seating/console system in the seating configuration.
Figure 2:
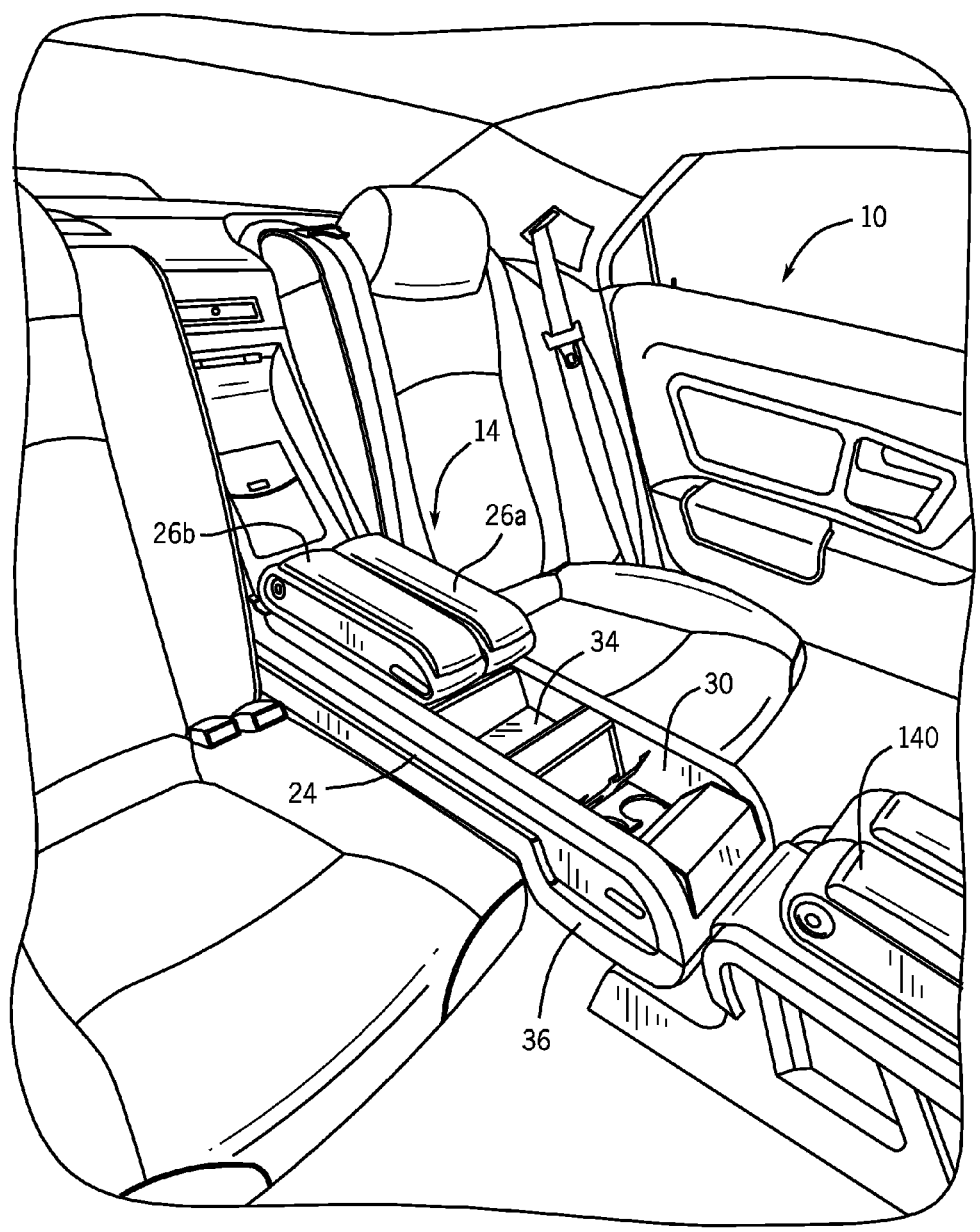
FIG. 2 is a perspective view of the seating/console system of FIG. 1 in the console configuration.
Figure 3:
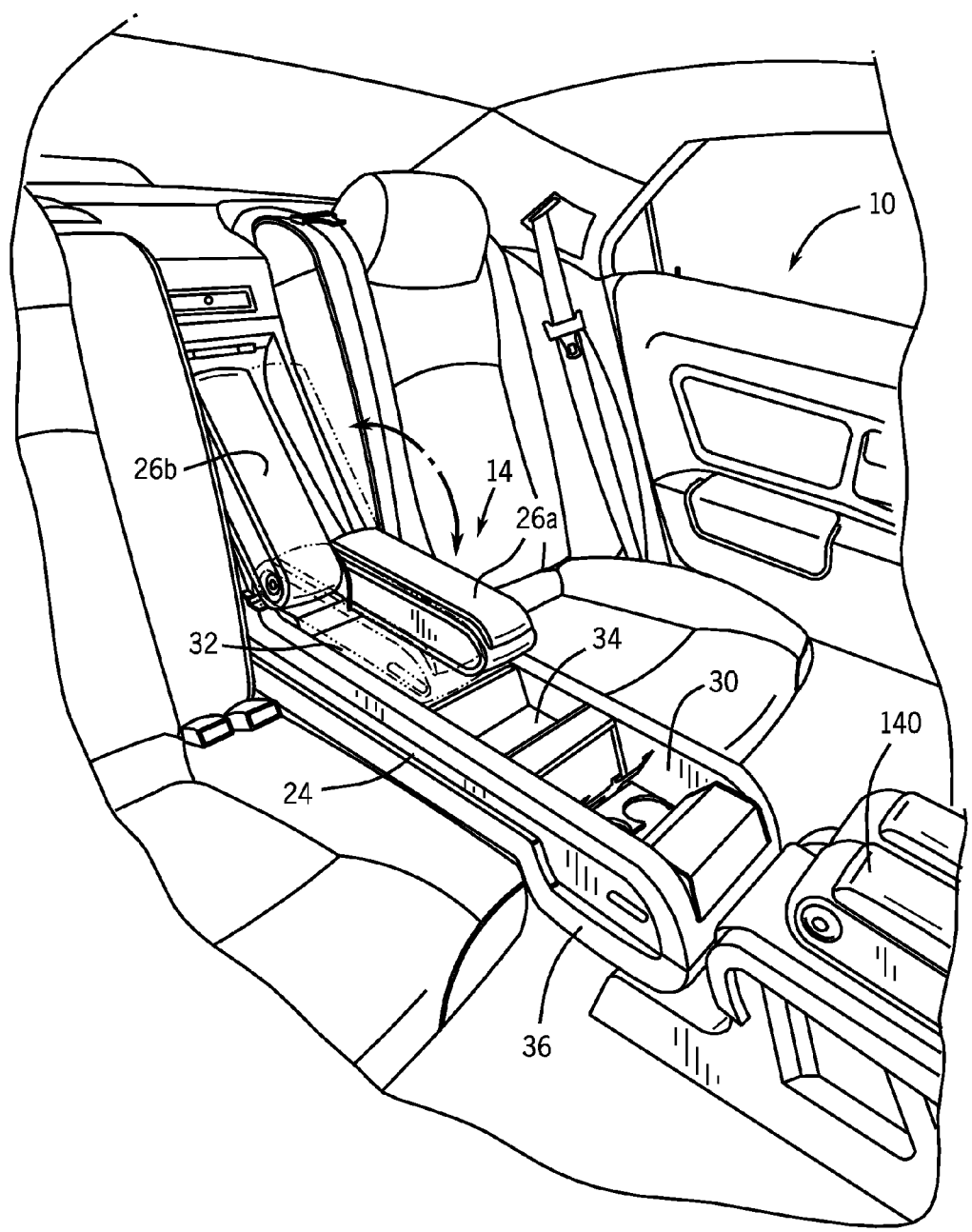
FIG. 3 is a perspective view of the seating/console system of FIG. 3 with storage and arm rest components in a alternative configuration and arrangements.
Figure 4A:
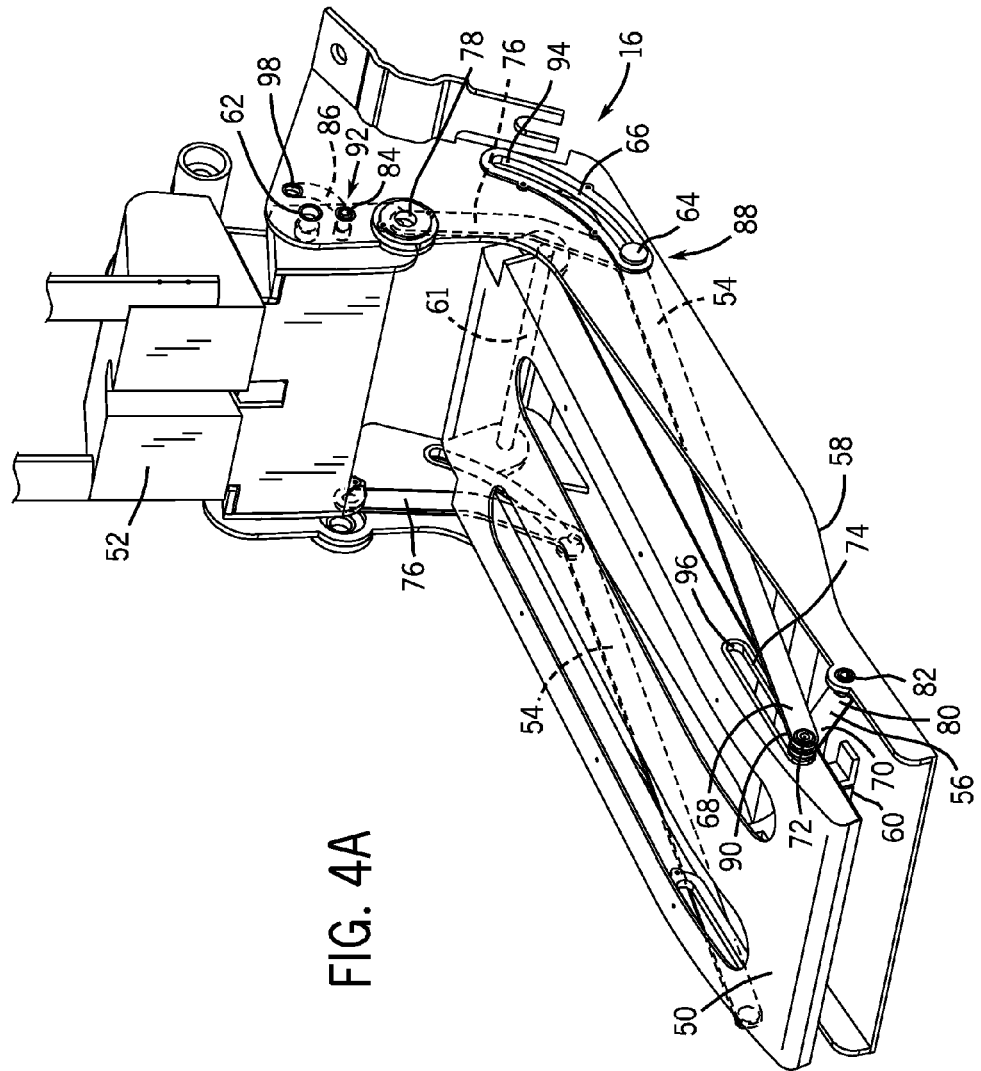
FIGS. 4A and 4B are side views of the seating/console system of FIGS. 1 and 2 being moved between the seating configuration and the console configuration.
Figure 4B:
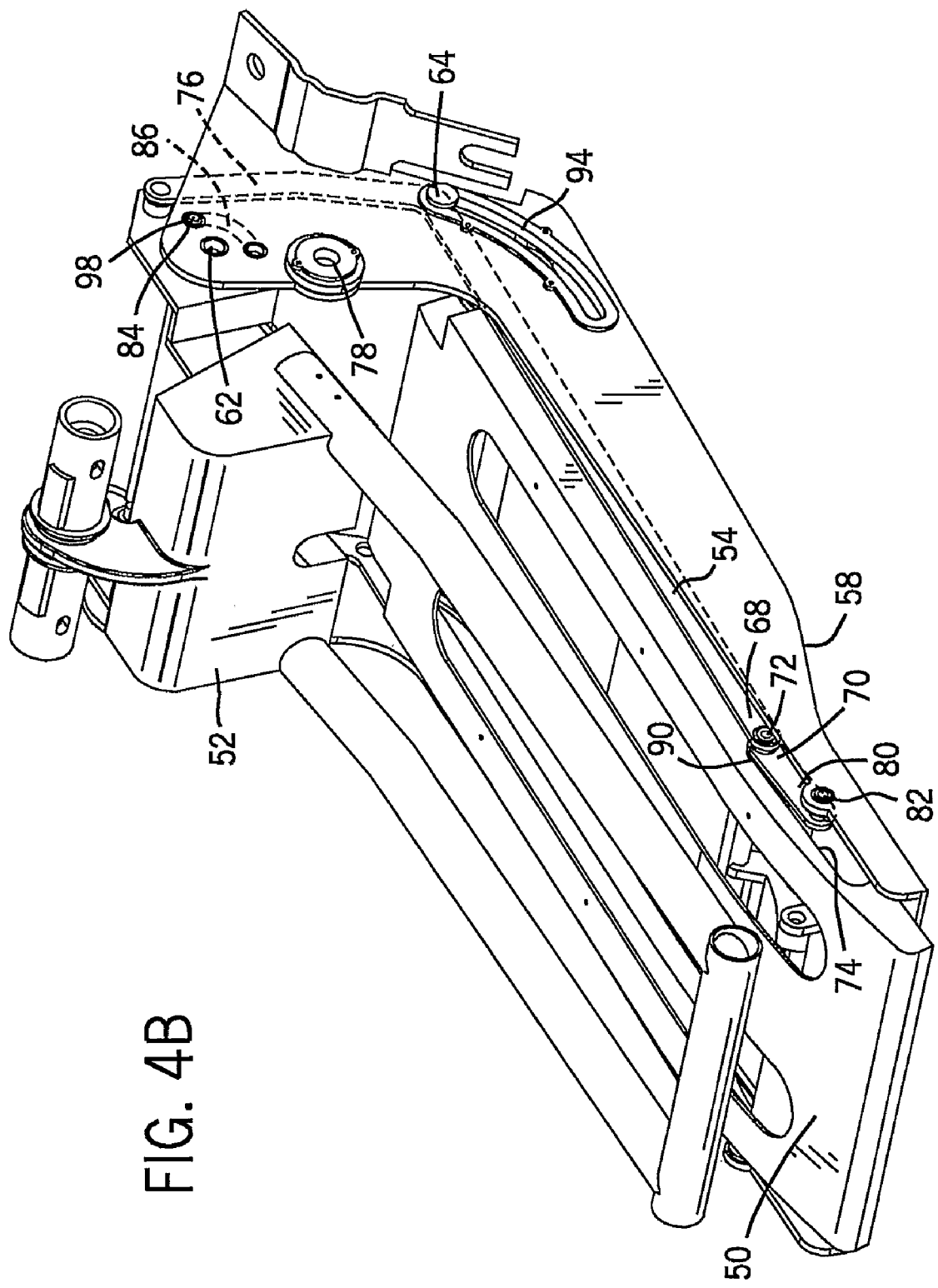
Figure 5A:
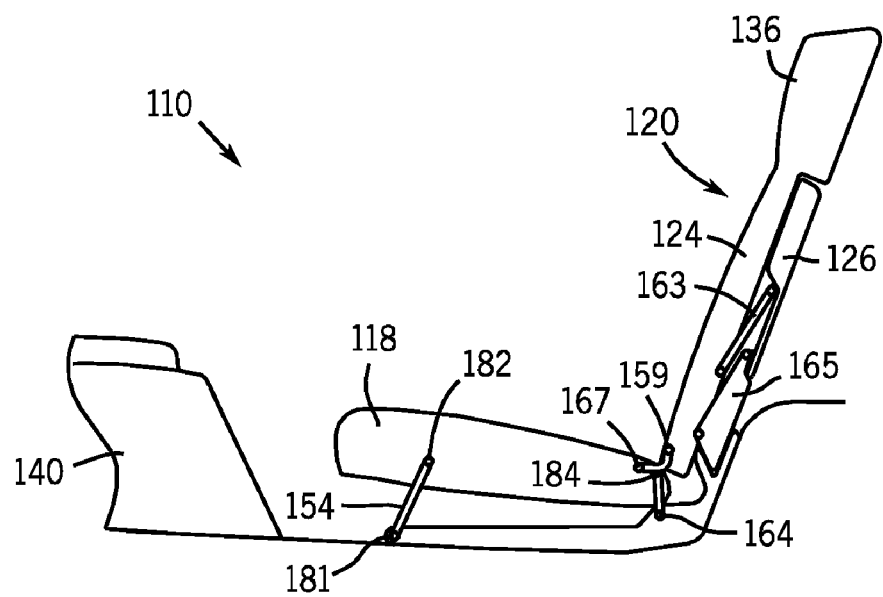
FIGS. 5A-5E are side views of the seating/console system according to an exemplary embodiment being moved between the seating configuration and the console configuration.
Figure 5B:
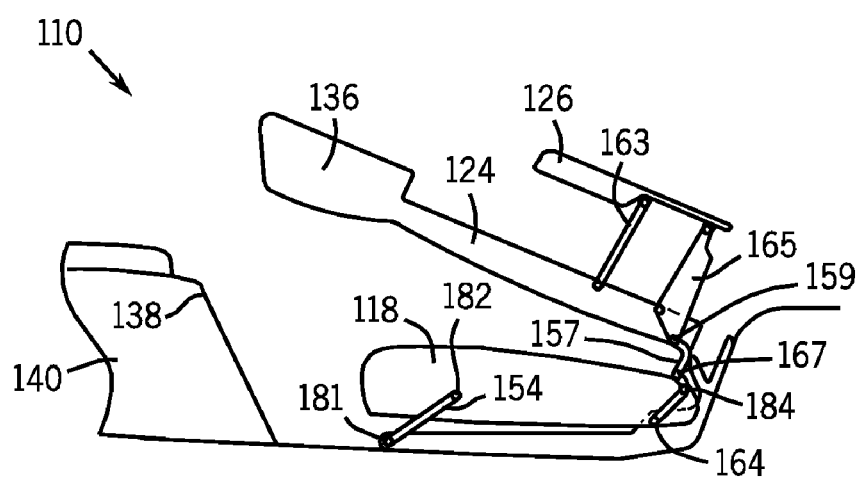
Figure 5C:
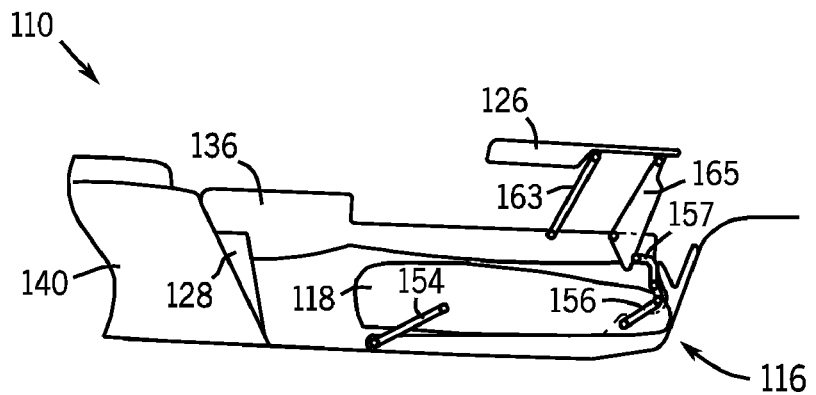
Figure 5D:
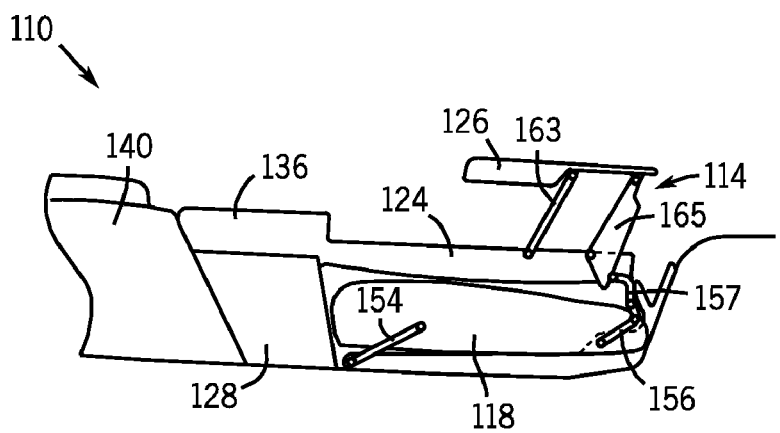
Figure 5E:
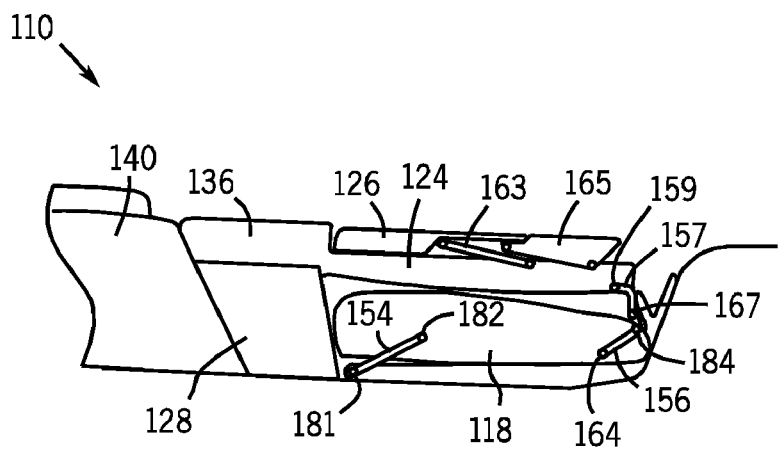

FIGS. 1 and 2 show a seating and console system 10 according to a preferred embodiment. Seating and console system 10 is configurable (or reconfigurable) in a seating configuration (i.e., position, status, condition, etc.) as shown in FIGS. 1 and 4A and a console configuration (i.e., position, status, condition, etc.) as shown in FIGS. 2 and 4B. According to a preferred embodiment, system 10 is located between two seats (i.e., a middle seating position). System 10 may be used in the second row, third row, or the like. The vehicle may be an automobile (e.g., sedan, coupe, etc.), a van or "mini-van,"

truck, or a sport utility vehicle (SUV). According to alternative embodiments, the system may be located in any of a variety of positions and rows within the vehicle. Seating and console system 10 includes seating components or elements 12, console components or elements 14, and an articulation mechanism 16. Seating and console elements 12, 14 may have dual functionality for seating and console, or be dedicated to one of these applications. In the seating condition, the seating elements 12 are deployed and the console elements 14 are stowed. In the console condition, the seating elements 12 are stowed and the console elements 14 are deployed Seating elements 12 include a seat cushion or base 18, a seat back or backrest 20, and a headrest 22. Each of the elements may include a substrate or frame, foam or other type of padding, and a covering (e.g., skin, leather, vinyl, fabric, etc.).

Console elements 14 include a base 24 and an armrest 26. Base 24 includes one or more features typically found on a console such as cupholder(s) 30, a tray 32, various storage areas (such as bins 34 which may or may not be accessible through a door or panel), power or data ports, controls (e.g. entertainment, HVAC (i.e., heating, ventilation, and air conditioning), windows, heated seats, etc.), or the like. Armrest 26 is preferably pivotable and linearly adjustable (e.g., in the fore-aft direction of the vehicle). The armrest 26 may be coupled or mounted to base 24 or otherwise to the vehicle.

According to a preferred embodiment, a duel purpose or function component is movable (rotate, pivot, etc.) to provide or present either backrest 20 (when system 10 is a seating configuration) or console 14 (when system 10 is in a console configuration). The movement of the seating elements 12 and/or the console elements 14 are coordinated (e.g., by the articulation mechanism 16). For example, movement of the console between the stowed condition and the deployed condition articulates the other component to the other position. Articulation mechanism 16 generally includes one or more pivot axes, slides, guides, linkages, pivots, members, or the like, depending on the embodiments that are configured to provide the coordinated movement (e.g., configuration, reconfiguration, transformation, etc.) of the seat and/or the console between the seating condition and the console condition. According to a preferred embodiment, articulation mechanism 16 includes a multi-bar linkage (e.g., a four-bar linkage) as shown in FIGS. 4A-4B or FIGS. 5A-5E.

Referring to FIGS. 4A and 4B, articulation mechanism 16 is configured to rotate or pivot the seat downward in the vehicle and rotate or pivot seatback/console between the seat configuration (FIG. 4A) and the console configuration (FIG. 4B). Articulation mechanism includes a seat frame 50, a backrest and console frame 52, a first link arm or member 54, and a second link arm or member 56. A corresponding set of first and second link members are located on the opposite side of the base frame 58, seat frame 50, and seat back/console frame 52. Seat frame 50 is coupled to a base frame 58 by first link members 54, second link members 56, a pivoting support arm 60, and pin or shaft 61. Pin 61 couples the rearward portion of seat frame 50 to base frame 58 so that seat frame 50 pivots or rotates about pin 61. Support arm 60 provides position and support to seat frame 50 when in the raised position and guided movement when pivoting to the lowered position. Backrest and console frame 52 is coupled to base frame 58 by first link member 54 and a pivot pin 62. First link member 54 is slidably coupled to base frame 58 by engagement of a pin 64 with a slot 66 in a side of base frame 58. A first end 68 of first link member 54 and a first end 70 of second link member 56 are slidably coupled to seat frame 50 by a pin 72 engaging a slot 74 on a side of seat frame 50. A second end 76 of first link member 54 is coupled to base frame 58 by a pin 78 extending from backrest and console frame 52 engaging a slot 86 on an upper side portion of base frame 58. A second end 80 of second link member 56 is rotatably or pivotally coupled to base frame 58 by a pin 82. Slots 66 and/or 74 may be straight (linear) or curved, depending on the desired movement of seat frame 50 and/or seat and console frame 52. According to a preferred embodiment, first link member 54 is formed by as a single member or bar. Alternatively, the first link member may be a pair of members coupled together at pin 64.

In the seat configuration, pin 64 is in a forward end 88 of slot 66, pin 72 is in a forward end 90 of slot 74, and pin 84 is in a forward (and lower) end 92 of slot 86. When system is being reconfigured from the seat configuration to the console configuration, backrest and console frame 52 is pushed/pulled by the user so that the top portion rotates forward (relative to the vehicle) and downward (towards the seat). Backrest and console frame 52 pivots about pin 62, which causes pin 84 to move or slide along slot 86, and second end 76 of first link member 54 to move rearward, rotating about axis of pin 62, which causes pin 64 to move or slide along slot 66 and pin 72 to move or slide along slot 74. Movement of pin 72 along slot 74 causes seat frame 50 to pivot about pin 61 and the front portion of seat frame to pivot downwardly (lower). In the console configuration, pin 64 is in a rearward end 94 of slot 66, pin 72 is in a rearward end 96 of slot 74, and pin 84 is in a rearward (and upper) end 98 of slot 86. The pivots and slides may be provided with a friction based and/or be spring loaded to dampen and/or assist the movement of the duel purpose component (backrest 20 and console 14).

According to an alternative embodiment, the movement of the seating elements 12 and/or the console elements 14 are not coordinated (e.g., by the articulation mechanism 16). For example, separate operations or inputs by the operator (e.g., vehicle occupant) cause the stowing or deployment. An alternative embodiment may articulate only the seat 18 or backrest 20 to create a console. Alternatively, the seating and console system may have different levels of transformation (e.g., not connecting to the front console 40, not closing out the seat back area, and the like. In yet another alternative embodiment, deployment steps or operations may be added to achieve a console "look" by extending the front console 140 rearward to provide a console. Backrest and console frame 52 is also coupled base frame 58 by a pin 84 extending into (and/or through) a slot 86. Pin 84 slides in slot 86 as backrest and console frame 52 is pivoted or rotated, and are configured to co act to provide a stop to guide and limit the movement (rotation/pivoting) of backrest and FIGS. 5A-5E show a series of schematic exemplary representations of movement of a seating and console system 110 between the console configuration and the seating configuration. According to an alternative embodiment the console elements 114 include a console portion 136 that engages a surface 138 in the front floor console 140. Close out panels 128 moves or slides out from front console 140 between deployed and stowed positions. In the deployed position, an end of panel 128 that abuts or touches up against a portion of the console base 124. According to an alternative embodiment, the console portion 136 and front console 140 may be configured to engage one another (e.g., a snap or latching type of coupling). System 110 actuates (e.g., moves, articulates, etc.) between the seating configuration (FIG. 5A) and the console configuration (FIGS. 5D and 5E) by guided movement of actuation mechanism 116. Mechanism 116 includes a first link member 154, a second link member 156, and a third link member 157. First link member 154 pivots about a pins 181, 182 (coupling member 154 to seat 118). Second link member 156 pivots about a pin 164 (coupling member 156 to seat 118) and a pin 184 (coupling member 156 to third link member 157). Third link member 157 pivots about a first pin 167 (coupling member 157 to second member 156) and a pin 159 (coupling member 157 to backrest 120). Moving to the console configuration lowers seat 118. An armrest 126 may be raised and lowered by pivoting on members 163 and 165.

Figure 6:
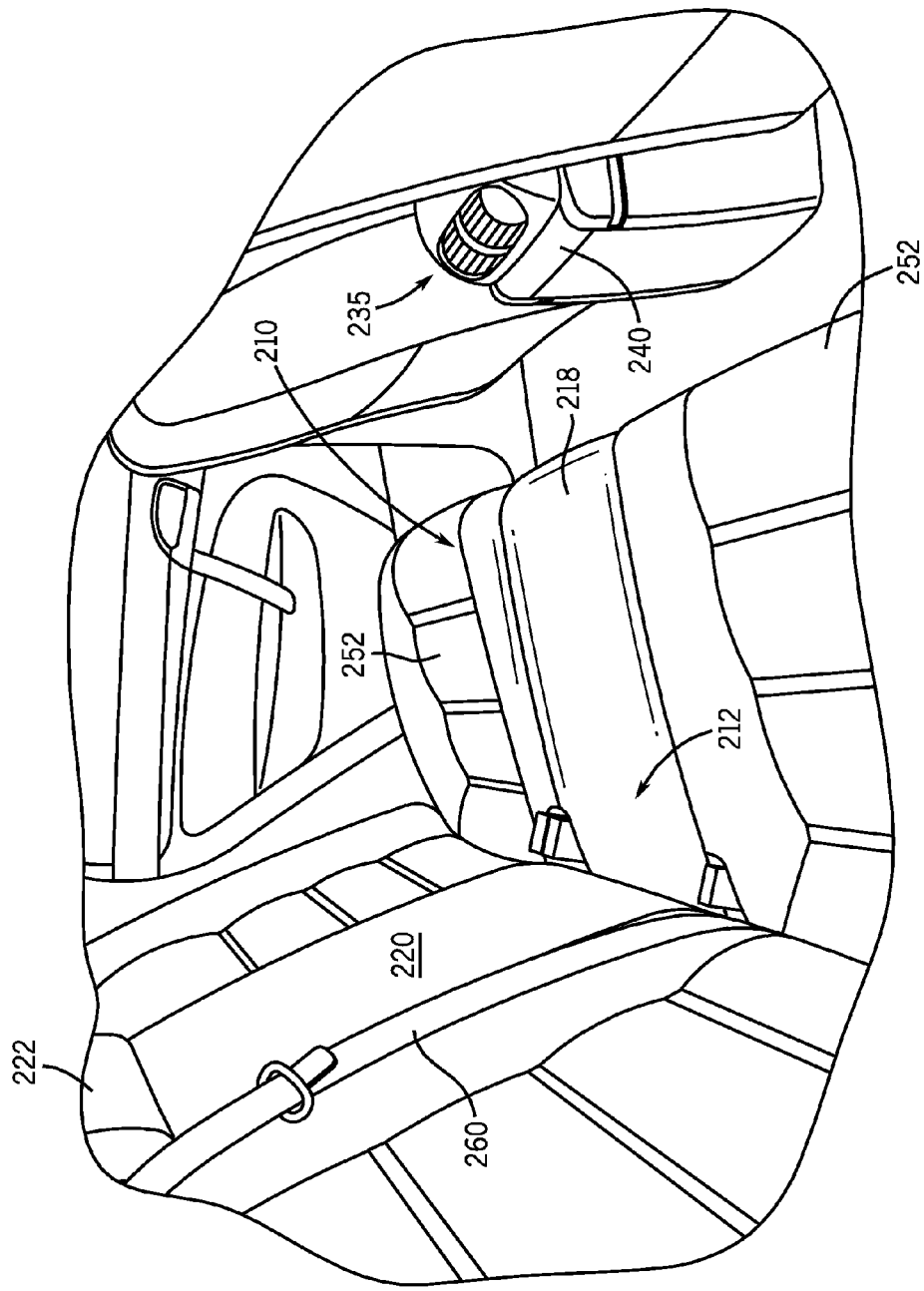
FIGS. 6 and 7 are perspective views of a seating/console system in a seating configuration and a console configuration according to an alternative embodiment.
Figure 7:
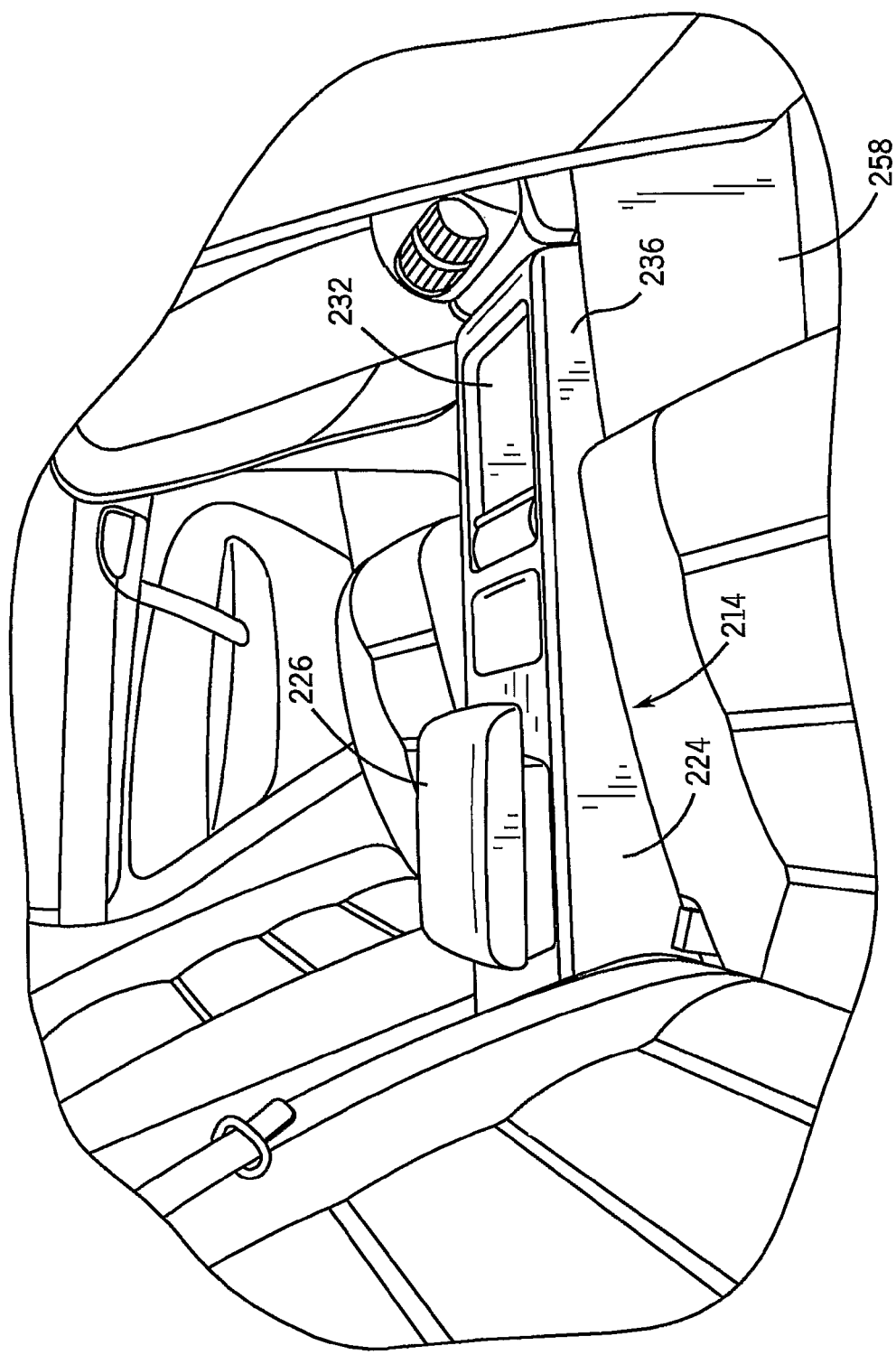

FIGS. 6 and 7 show a seating and console system 210 according to a preferred embodiment. Seating and console system 210 is configurable (or reconfigurable) in a seating condition (i.e., position, status, configuration, etc.) as shown in FIG. 6 and a console condition (i.e., position, status, configuration, etc.) as shown in FIG. 7. According to a preferred embodiment, system 210 is located between two seats (i.e., a middle seating position). Seating and console system 210 may be used in the second row 252, third row, or the like. According to alternative embodiments, the system may be located in any of a variety of positions and rows within the vehicle. Seating and console system 210 includes seating components or elements 212, console components or elements 214, and an articulation mechanism. A seatbelt system 260 may also be provided. Seating and console elements 212, 214 may have dual functionality for seating and console, or be dedicated to one of these applications. In the seating condition, the seating elements 212 are deployed and the console elements 214 are stowed. In the console condition, the seating elements 212 are stowed and the console elements 214 are deployed Seating elements 212 include a seat cushion or base 218, a seat back or backrest 220, and a headrest 222. Console elements 214 include a base 224, an armrest 226, and one or more close out members 258 (e.g., panels, doors, screens, etc.). Base 224 includes one or more features typically found on a console such as one or more cupholders, a tray 232, various storage areas (such as bins which may or may not be accessible through a door or panel), power or data ports, controls 235 (e.g. entertainment, HVAC (i.e., heating, ventilation, and air conditioning), windows, heated seats, etc.), or the like. Armrest 226 is preferably pivotable and linearly adjustable (e.g., in the fore-aft direction of the vehicle).

Close out members 258 are configured to obscure (e.g., hide, conceal, cover, screen, etc.) gaps/spaces and/or structure (e.g., curvature that shows the seat, the articulation mechanism, etc.) that is inconsistent with a desired appearance of the console being a permanent fixture in the vehicle interior. For example, the area or space below the console extender 236 when it is engaged with the front floor console in the console configuration is obscured by one or more close out panels 258. The close out members 258 may be panels that extend or slide from the front seat, the configuring seat, the adjacent seat, the front console 240, or pivot or rotate from any of these components, or the like. According to an exemplary embodiment, the close out member 258 form a tunnel on a rail configured to add convenience and features for the vehicle occupants, create hidden storage, and allow close out of the rear console. The console is intended to maintain the appearance of a permanent fixture within the vehicle such that gaps, spaces, engagements, or the like are minimized in both stored and extended positions.

Figure 8:
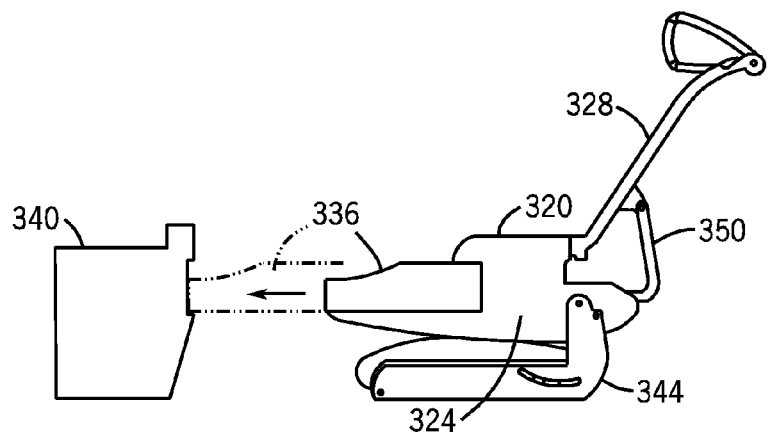
FIGS. 8 and 9 are perspective views of a seating/console system in a seating configuration and a console configuration according to an alternative embodiment.
Figure 9:
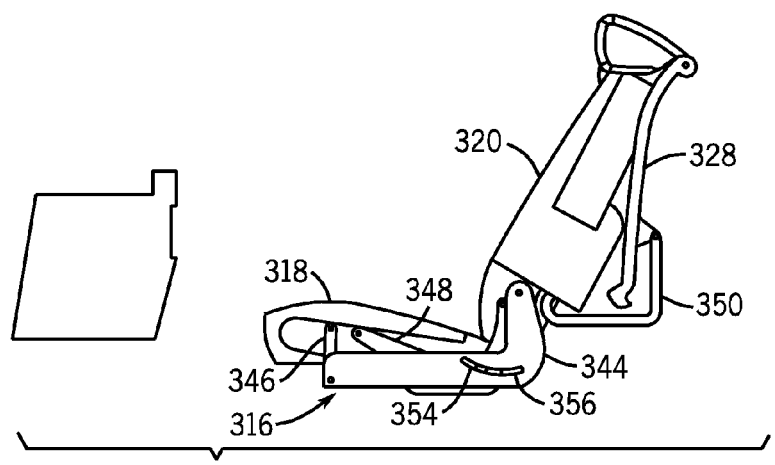

According to an exemplary embodiment shown in FIGS. 8 and 9, the articulation mechanism 316 includes a stationary main mounting structure or bracket 344, a first linkage 346, a second linkage 348, and a third linkage 350. The first linkage 346 couples the seat 318 to an end of the main mounting bracket 344 and is configured to guide the seat between the raised and lowered positions. The second linkage 348 couples the backrest 320 to the seat base 318, and couples the seat and backrest to the main mounting bracket 344. Preferably, a pin 354 extends from the main mounting bracket 344 to engage a slot 356 (e.g., a groove, notch, or the like which may be linear, curved, arcuate, etc.) and is configured to help guide the seat 318 into the lowered and retracted position as the console extender 336 is deployed. The third linkage 350 couples the close out member 328 to the console base 324 and is configured to move (e.g., rotate, pivot, etc.) between the stowed position and the deployed position. A console extender 336 that advances to engage or abut the front floor console 340. The backrest 320 pivots up so that the console base 424 and console may pivot out and into the deployed position. The console base 324 includes a console extender 426 (e.g., panel, member, etc.) that rotates out as the console base rotates into the deployed position.

According to exemplary embodiments, a variety of components may be used to attach the seats and the system to the vehicle in a variety of configurations of typical conventional vehicle designs (e.g., 40/20/40 split; 60/40 split; seat back/cushion split; or the like). According to an exemplary embodiment, the system utilizes a latching mechanism similar to those in conventional fold down seat arrangements. Preferably, the latching mechanism is located near the interface between the seat back and the seat cushion. According to exemplary embodiments the seats may be configured to move (e.g., separate) to allow deployment of the console system. After the seats have been separated, the console is then raised to its deployed position. An open seating type mechanism on the door bolsters are configured to take up slack on the seat as they are moved between the open and closed positions.

Figure 10:
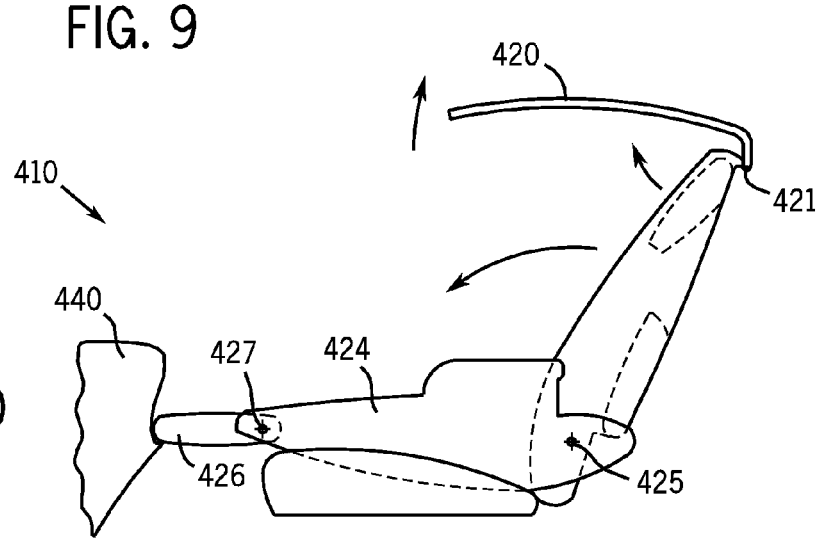
FIG. 10 is a side view a seating/console system according to an alternative embodiment.

FIG. 10 is a side view a seating/console system 410 according to an alternative embodiment illustrating engagement of the front floor console 440. Backrest 420 pivots about an axis 421 up so that console base 424 and console may pivot out (down) and into the deployed position. Console base 424 includes console extender 426 (e.g., panel, member, etc.) that rotates out about an axis 427 as console base 424 rotates into the deployed position about axis 425. Backrest 420 pivots back down to provide a close out 28 to the space behind the seats.

The materials for the seat and the console may be any of a variety of materials typically used for vehicle seating and consoles. For example, injection molded high density polyethylene is the preferred method and material for making components of the console, but other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Components of the articulation mechanism can be manufactured from stamped alloy materials such as steel or aluminum or from plastic.

Generally, the disclosed embodiments are directed to a seating and console system for use behind the first row of seats and configurable between a seating configuration and a console configuration. The system comprises seating components and console components associated with the seating components. At least a portion of the seating components are movable to provide the console configuration and at least a portion of the console components are movable to provide the seating configuration. The disclosed embodiments are further directed to a seating and console system for use behind the first row of seats and configurable between a seating configuration and a console configuration. The system comprises seating components and console components. The seating components comprise a seat base and a backrest coupled to the seat base. The console components comprise a base, an extender coupled to the base, and a close out member. The close out member is movable between a stowed position when the system is in the seating configuration and a deployed position when the system is in the console configuration. The seat base may be configured to move (e.g., lower relative to the outboard seats), guided by a linkage arrangement, when the system is reconfiguring to the console configuration. The base may have common structure with the console base.

It is also important to note that the construction and arrangement of the elements of the configurable seating and console system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the claims. Other substitutions, modifications, changes and omissions may be made in the design, operating conditions and arrangement of the preferred and other exemplary embodiments without departing from the spirit of the claims that follow.

What is claimed is:

1. A seating and console system for use in a seating row and configurable between a seating configuration and a console configuration, the system comprising:
   a seat including a base frame, a seat base movably coupled to the base frame, and a seat back, the seat back having a seating surface; and
   a console mounted to the seat back on a side opposite the seating surface;
   wherein the seat back rotates between a first position to provide the seating configuration and a second position to provide the console configuration that divides the seating row;
   wherein the seat back and the console are configured to have a coordinated movement such that the movement of one of the seat back and the console is configured to articulate the other of the seat back and the console to move in relation to each other;
   wherein the movement of the seat back drives movement of the seat base relative to the base frame.

2. The seating and console system of claim 1 further comprising an actuation mechanism coupled to the seat back, seat base, and the base frame and configured to transfer movement between the seat back and the seat base.

3. The seating and console system of claim 2 wherein the actuation mechanism comprises a first link member and a second link member, the first link member comprises a first end coupled to the seat base, a second end coupled to the seat back, and an intermediate portion coupled to the base frame, the second link member includes a first end coupled to the seat base and a second end coupled to the base frame.

4. The seating and console system of claim 3 wherein the end of the first link member and the first end of the second link member are coupled to a first pin that engages a slot in the seat base, wherein the intermediate portion of the first link member is coupled to a second pin that engages a slot in the base frame, wherein the second end of the first link member is rotatably coupled the seat back.

5. The seating and console system of claim 4 wherein the seat base is configured to move and be guided by engagement of the first pin in the slot on the seat base and the second pin in the slot on the base frame.

6. The seating and console system of claim 2 wherein the seat back comprises a stop pin that extends into a slot on the base frame to limit the rotating movement of the seat back.

7. The seating and console system of claim 1 wherein the console comprises a close out panel movable between a stowed position when the seat back is in the seating configuration and a deployed position when the seat back is in the console configuration.

8. The seating and console system of claim 1 wherein the console comprises a base and an extender coupled to the base and movable between a stowed position when the seat back is in the seat configuration and a deployed position when the seat back is in the console configuration.

9. The seating and console system of claim 8 wherein the extender slides linearly between the stowed position and the deployed position.

10. The seating and console system of claim 1 wherein the seat back pivots upward so that the console can pivot downward, the console including an extender that pivots between the stowed position and the deployed position to engage a front console.

11. A vehicle interior comprising:
    a first seating row comprising a first seat, a second seat, and a first row console between the first seat and the second seat;
    a second seating row comprising a first seat, a second seat, and a seating console system between the first seat and the second seat, the seating console system comprising:
    a seat comprising a seat base and a seat back;
    a second row console coupled to the seat and configured to engage the first row console in the first seating row;
    wherein the seating console system is configurable between a seating configuration to deploy the seat and stow the console, and a console configuration to deploy the console and stow the seat;
    wherein the seat back and the second row console are configured to have a coordinated movement such that the movement of one of the seat back and the second row console is configured to articulate the other of the seat back and the second row console to move in relation to each other.

12. The vehicle interior of claim 11 further comprising a panel configured to move between a deployed position to obscure a space between the console and the vehicle interior when the seating console system is in the console configuration, and a stowed position when the seating console system is in the seating configuration.

13. The vehicle interior of claim 12 wherein the panel slides out from the first row console in the first seating row.

14. The vehicle interior of claim 13 wherein the panel is located between the console of the seating console system and a floor of the vehicle interior when the seating console system is in the console configuration.

15. The vehicle interior of claim 11 wherein the first row console includes a recess configured to receive a portion of the console of the seating console system when in the console configuration.

16. The vehicle interior of claim 11 further comprising an articulation mechanism coupled to the seat base and configured to lower the seat base when the seating console system is in the console configuration.

17. The vehicle interior of claim 16 wherein movement of the seat back from a deployed position to a stowed position activates the articulation mechanism to lower the seat base.

18. The vehicle interior of claim 11 wherein the second seating row comprises a first outer seat and a second outer seat, the first outer seat comprises about 40 percent of the width of the second seating row, the second seat comprises about 40 percent of the second seating row, and the seating console system comprises about 20 percent of the width of the second seating row.

19. The vehicle interior of claim 11 further comprising a third seating row.

20. The vehicle interior of claim 11 wherein the console comprises at least one or more armrests, or storage bins, or cupholders, or power ports, or data ports, or controls, or combinations thereof.

21. A seating and console system for use in a seating row and configurable between a seating configuration and a console configuration, the system comprising:
- a seat including a seat base and a seat back having a stop pin;
- a console mounted to an opposite side of the seat back;
- a base frame and an actuation mechanism coupled to the seat back, seat base, and the base frame and configured to transfer movement between the seat back and the seat base;
- wherein the seat back rotates between a first position to provide the seating configuration and a second position to provide the console configuration that divides the seating row;
- wherein the stop pin extends into a slot on the base frame to limit the rotating movement of the seat back.

* * * * *